(12) United States Patent
Schluchter

(10) Patent No.: US 9,857,512 B1
(45) Date of Patent: Jan. 2, 2018

(54) SYSTEMS FOR PASSIVE OPTICAL CORRECTION OF POLARIZATION LEAKAGES

(71) Applicant: KEYSIGHT TECHNOLOGIES, INC., Loveland, CO (US)

(72) Inventor: Clay Schluchter, Los Altos, CA (US)

(73) Assignee: KEYSIGHT TECHNOLOGIES INC., Loveland, CO (US)

( * ) Notice: Subject to any disclaimer, the term of this patent is extended or adjusted under 35 U.S.C. 154(b) by 0 days.

(21) Appl. No.: 15/199,870

(22) Filed: Jun. 30, 2016

(51) Int. Cl.
*G02B 5/30* (2006.01)
*G02B 27/28* (2006.01)
*G02B 27/00* (2006.01)

(52) U.S. Cl.
CPC ....... *G02B 5/3083* (2013.01); *G02B 27/0025* (2013.01); *G02B 27/286* (2013.01)

(58) Field of Classification Search
CPC . G02B 5/3083; G02B 27/0025; G02B 27/286
USPC .............. 359/489.02–489.05; 356/453, 487, 356/491–495
See application file for complete search history.

(56) References Cited

U.S. PATENT DOCUMENTS

| 6,198,574 | B1 * | 3/2001 | Hill | G02B 5/122 359/485.06 |
|---|---|---|---|---|
| 7,612,888 | B2 * | 11/2009 | Serikawa | G01B 11/306 356/485 |
| 2009/0135430 | A1 * | 5/2009 | Zhu | G01B 9/02019 356/487 |
| 2010/0245837 | A1 * | 9/2010 | Yamamoto | H04B 10/677 356/491 |
| 2014/0368831 | A1 * | 12/2014 | Ser | G01B 9/02002 356/491 |
| 2015/0002852 | A1 * | 1/2015 | de Groot | G01B 9/0209 356/491 |
| 2015/0043004 | A1 * | 2/2015 | Tan | G01B 9/02045 356/487 |
| 2016/0139033 | A1 * | 5/2016 | Zallat | G01N 21/21 356/365 |

OTHER PUBLICATIONS

Schmitz et al, "Bench-top setup for validation of real time, digital periodic error correction", Precision Engineering, vol. 30, Jan. 2006, pp. 306-313.*
Joo et al, "Simple heterodyne laser interferometer with subnanometer periodic errors", Optics Letters, vol. 34, No. 3, Feb. 1, 2009, pp. 386-388.*
Hu et al, "Compensation for the Variable Cyclic Error in Homodyne Laser Interferometers", Sensors 2015, 15, 3090-3106; doi:10.3390/s150203090, Jan. 30, 2015, pp. 3090-3106.*
Ellis et al, "Fiber-coupled displacement interferometry without periodic nonlinearity", Optics Letters, vol. 36, No. 18, Sep. 15, 2011, pp. 3584-3586.*

\* cited by examiner

*Primary Examiner* — Frank Font

(57) ABSTRACT

Passive optical systems and methods for improving polarization of an optical reference beam are disclosed. For example, an optical system includes first and second quarter wavelength plates (QWPs) positioned in a beam path of the optical system. The second QWP is positioned in the beam path such that a fast axis of the second QWP is substantially orthogonal to a fast axis of the first QWP. First and second polarization elements are also positioned in the beam path. The first and second polarization elements are each configured to provide both diattenuation and retardance of the optical reference beam.

20 Claims, 3 Drawing Sheets

SYSTEMS FOR PASSIVE OPTICAL CORRECTION OF POLARIZATION LEAKAGES

TECHNICAL FIELD

The presently disclosed subject matter relates to passive optical systems and optical heterodyne interferometry. Particularly, the presently disclosed subject matter relates to techniques for polarization correction in order to minimize periodic error of optical reference sources.

BACKGROUND

Interferometry includes techniques of superimposing two electromagnetic waves to extract information about one or both of the waves. These electromagnetic waves may be laser generated optical waves. Optical interferometer position measurement systems can provide very precise position and distance information for dimensional measurements and motion control. Optical heterodyne interferometers use an optical reference source wave having a frequency $f_1$ mixed with a second optical wave having a frequency $f_2$. The result of the mixing produces a summation frequency component $f_1+f_2$ and a difference frequency component $f_1-f_2$. The difference frequency component $f_1-f_2$ can be more easily measured for phase and frequency shifts than directly measuring the second optical wave.

One source of measurement error for optical heterodyne interferometers is periodic error of the optical reference source. Periodic error (also called polarization distortion and polarization error) results from an impure polarization state of the optical reference source wave. The solution to date has been to use waveplates to correct the polarization state and limit tolerances on the optical materials, coatings, and geometric errors on elements that the optical reference beam transverses. Polarization ellipticity can be corrected in one optical wave with waveplates but cannot generally be corrected in both optical waves simultaneously with waveplates. Also, non-orthogonality of the polarization states cannot be corrected by waveplates.

Therefore, there is a need to provide improved polarization and reduced periodic error for optical reference sources and optical heterodyne interferometers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Passive optical systems for improving polarization of an optical reference beam are disclosed herein. In a representative embodiment, an optical system includes first and second quarter wave plates (QWPs) positioned in a beam path of the optical system. The second QWP is positioned in the beam path such that a fast axis of the second QWP is substantially orthogonal to a fast axis of the first QWP. First and second polarization elements are also positioned in the beam path. The first and second polarization elements are each configured to provide both diattenuation and retardance of the optical reference beam.

In other embodiments, the optical system is configured to substantially reduce a periodic error of the optical reference beam. The first QWP may be configured such that a slow axis of the first QWP is parallel to a polarization vector of a first optical wave of the optical reference beam. The second QWP may be configured such that a slow axis of the second QWP is perpendicular to the slow axis of the first QWP. The first polarization element may include a first waveplate having a surface with an anti-reflective (AR) coating and a surface without an AR coating and the second polarization element may include a second waveplate having a surface with an AR coating and a surface without an AR coating.

In other embodiments, the first polarization element may be configured to provide a tunable rotational angle about a surface normal of the first polarization element and a tunable incident angle relative to the beam path. The second polarization element may be configured to provide a tunable rotational angle about the surface normal of the second polarization element and a tunable incident angle relative to the beam path. The first QWP may be positioned such that a surface normal of the first QWP is substantially parallel to the beam path and the second QWP may also be positioned such that a surface normal of the second QWP is substantially parallel to the beam path.

In other embodiments, the optical system may be a passive optical system. The optical system may also be configured to provide an exiting beam that is substantially parallel to an incident beam. The first QWP may be positioned first in the beam path and the first polarization element may be positioned between the first QWP and the second QWP.

In other embodiments, the first polarization element may be positioned first in the beam path and the first QWP may be positioned between the first polarization element and the second polarization element.

In other embodiments, the optical system may be integrated within at least one of the optical reference source or an optical heterodyne interferometer. In other embodiments, the optical system may be integrated within a laser scanning device. In other embodiments, the optical system may be integrated within at least one a communication based fiber optic transmitter device, a communication based fiber optic receiver device, or a fiber optic amplifier. In other embodiments, the optical system may be integrated within a passive optical fiber assembly. In other embodiments, the optical system may be integrated within a fiber optic sensor system.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a, an' and 'the' include both singular and plural referents, unless the context clearly dictates otherwise. Thus, for example, 'a device' includes one device and plural devices.

The described embodiments relate to optical systems and more specifically to passive optical systems that improve polarization of an optical signal.

Figure 1:
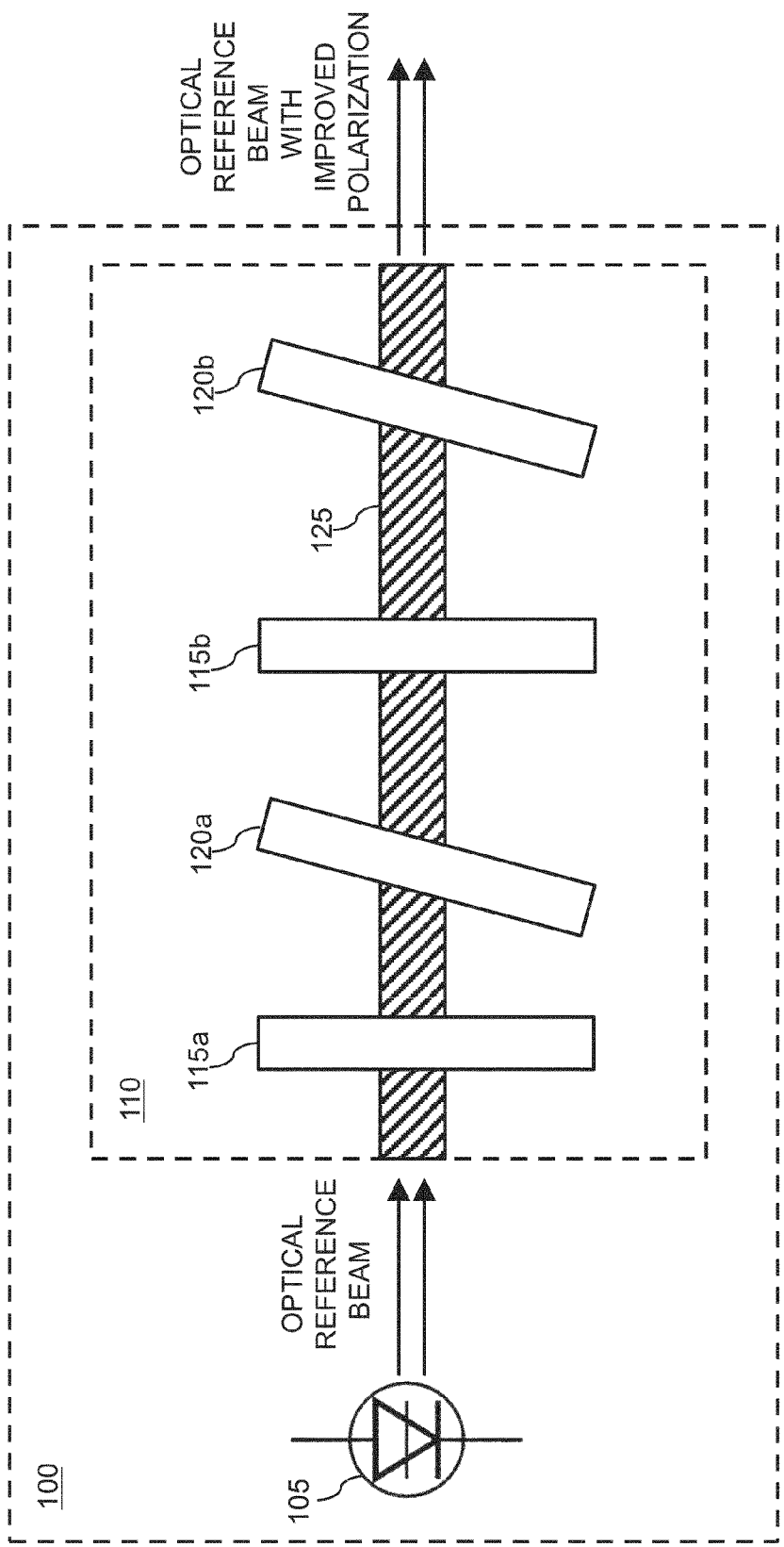
FIG. 1 is a diagram of an optical reference source that includes a laser and an integrated optical system in accordance with embodiments of the present disclosure.

FIG. 1 illustrates a diagram of an optical reference source 100 that includes a laser 105 and an integrated optical system 110 in accordance with embodiments of the present disclosure. The laser 105 can produce an optical reference beam having limited periodic error. As the optical reference beam passes through the optical system 110, periodic error can be substantially reduced. In certain embodiments, limited periodic error can be reduced to a non-measureable level for currently produced test equipment.

The optical system 110 includes quarter wavelength plates (QWPs) 115a and 115b, and polarization elements 120a and 120b each positioned in a beam path 125. The beam path 125 includes a center axis (i.e., a propagation axis) of the optical system 110 through which the optical reference beam transverses. The first QWP 115a is positioned in the beam path 125 closest to the laser 105. The first polarization element 120a, the second QWP 115b, and the second polarization element 120b are respectively positioned next in the beam path 125 as illustrated in FIG. 1. In other embodiments, the QWPs 115a and 115b, and the polarization elements 120a and 120b may be positioned in alternate configurations. For example, the first QWP 125a may be positioned farthest from the laser 105 in the beam path 125 and after the second polarization element 120b.

The first and second QWPs 115a and 115b are each configured such that a slow axis of the first QWP is parallel to a polarization vector of a first optical wave of the optical reference beam. The second QWP 115b is also positioned in the beam path 125 such that a fast axis of the second QWP 115b is substantially orthogonal to a fast axis of the first QWP 115a. Further, the first and second QWPs 115a and 115b may be positioned such that their surface normals are substantially parallel to the beam path 125. The first and second QWPs 115a and 115b may be fixed in position and non-tunable.

The first and second polarization elements 120a and 120b are each configured to provide a transmission coefficient for an S polarization state that is different than a transmission coefficient for a P polarization state. The "P" polarization state lies with the plane of incidence and the "S" polarization state is orthogonal to the plane of incidence. This difference in transmission coefficients between the "S" and "P" polarization states is diattenuation (also called "dichroism").

Polarization elements 120a and 120b may each be implemented using a single waveplate. Diattenuation and retardation may be provided by the waveplate. The waveplate can have a surface with an anti-reflective (AR) coating and another surface without an AR coating. Specifically, Fresnel transmission coefficients from an uncoated surface differentiate between "S" and "P" polarization states and are functions of the angle of incidence. By leaving one surface of the waveplate uncoated, this effect can be achieved in a single optic. Also, the S" and "P" polarization states are independent from the crystalline based fast and slow axes.

In other embodiments, the polarization elements 120a and 120b may each be implemented with a plurality of optics.

Polarization elements 120a and 120b may be tunable in two degrees of freedom. As such, the first polarization element 120a may be configured to provide a tunable rotational angle to the fast axis of the first QWP and a tunable incident angle relative to the beam path. The second polarization element 120b may also be configured to provide a tunable rotational angle to the second axis of the second QWP and a tunable incident angle relative to the beam path.

Specifically, for example, the tunable rotational angle can be varied about a surface normal of the waveplate. The rotational angle can be tuned to align fast and slow axes of the waveplate with respect to horizontal and vertical planes of the optical reference beam. The tunable incident angle is an angle of the surface normal of the waveplate relative to the propagation axis of the optical reference beam (i.e. the center axis of the beam path). The tunable incident angle is varied to align the plane of incidence relative to the horizontal and vertical planes of the optical reference beam. As the tunable incident angle is increased the diattenuation is increased. As such, a non-zero value of the tunable incident angle is required for periodic error correction to occur. As diattenuation is increased, power in the optical reference beam is reduced. However, this loss in power may be acceptable dependent on the application.

In embodiments, the difference in transmission coefficients is between 0 and 50%. The polarization elements 120a and 120b are each further configured to provide retardation to the optical reference beam. A relative phase is different between the "S" and "P" polarization states. In the embodiments, the retardation is between 0 and ¼ of a wavelength of the optical reference beam. Specifically, diattenuation and retardation may be selected to best correct the limited periodic error of the laser 105.

In other embodiments, the optical system 110 may be a passive optical system, and the optical system 110 may be further configured for an optical reference beam having a wavelength between 400 and 696 nanometers. In other embodiments the wavelength may be between 700 and 1800 nanometers. The optical system 110 may also be configured to provide an exiting beam that is substantially linear to an incident beam.

In accordance with embodiments, Jones calculus may be used to describe in mathematical terms the optical system 110. The laser 105 may be polarized and has limited periodic error. Specifically, Jones calculus may be used to represent periodic error associated with the optical reference beam.

Jones vectors may be used to calculate how an electric field evolves when the polarization of the optical reference beam is altered by the optical system 110. In other embodiments, the optical reference beam may have excess periodic error that exceeds the capabilities of Jones calculus. In these embodiments, Stokes calculus may be used to describe in mathematical terms the optical system 110.

The Jones vector is represented by a 1 by 2 column vector. The two components of the Jones vector are the complex horizontal $E_H$ and complex vertical $E_V$ components of the optical reference beam as shown in the following equation:

$$\vec{E} = \begin{pmatrix} E_H \\ E_V \end{pmatrix} = \begin{pmatrix} |E_H| e^{i\alpha_H} \\ |E_V| e^{i\alpha_V} \end{pmatrix}$$

The ratio of magnitudes $|E_H|/|E_V|$ and the phase difference $\alpha_H - \alpha_V$ between these components are related to elliptical polarization, specifically the angle of the polarization ellipse and the ellipticity. Elliptical polarization may also be more effectively described by Stokes calculus.

Figure 2:
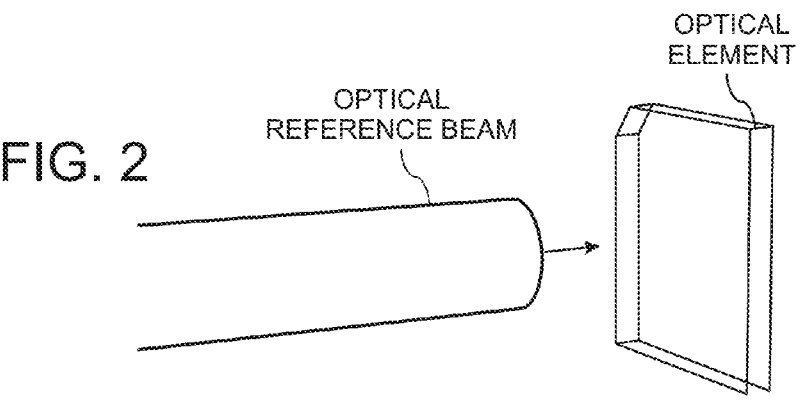
FIG. 2 is a simple diagram of a simple optical element positioned in an optical reference beam in accordance with embodiments of the present disclosure.

A transformation that occurs to the polarization of the optical reference beam as it interacts with an optical element, as shown in FIG. 2, may be represented by the Jones matrix. The Jones matrix is a 2 by 2 matrix having complex numbers. If the optical element purely preserves an input vector then, the optical element may be represented by an identity matrix as shown in the following equation:

$$\begin{pmatrix} 1 & 0 \\ 0 & 1 \end{pmatrix}$$

$$\begin{pmatrix} E_H \\ E_V \end{pmatrix} = \begin{pmatrix} 1 & 0 \\ 0 & 1 \end{pmatrix} \cdot \begin{pmatrix} E_H \\ E_V \end{pmatrix}$$

Figure 3:
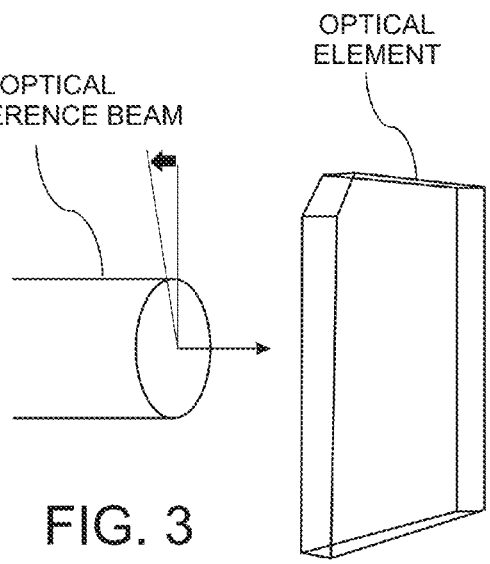
FIG. 3 is a simple diagram of an optical element providing vector rotation of the optical reference beam in accordance with embodiments of the present disclosure.

Losses and common mode propagation paths are proportional to the identity matrix. Vector rotations, as shown in FIG. 3, are more complicated and may be modeled as follows:

$$\begin{pmatrix} \cos(\theta) & \sin(\theta) \\ -\sin(\theta) & \cos(\theta) \end{pmatrix}$$

$$\begin{pmatrix} E_H \cos(\theta) + E_V \sin(\theta) \\ E_V \cos(\theta) - E_H \sin(\theta) \end{pmatrix} = \begin{pmatrix} \cos(\theta) & \sin(\theta) \\ -\sin(\theta) & \cos(\theta) \end{pmatrix} \cdot \begin{pmatrix} E_H \\ E_V \end{pmatrix}$$

Transformations stack right to left, wherein the typical optical layout shows rays or beams propagating left to right) as follows:

$$T \cdot \begin{pmatrix} E_H \\ E_V \end{pmatrix} = T_n \cdot \ldots \cdot T_3 \cdot T_2 \cdot T_1 \cdot \begin{pmatrix} E_H \\ E_V \end{pmatrix}$$

$$T = T_n \cdot \ldots \cdot T_3 \cdot T_2 \cdot T_1$$

If a matrix is nonsingular, (i.e. if the determinant is nonzero) then the inverse of the matrix may be defined as follows:

$$A^{-1} = \frac{1}{\det A} (adj A)$$

$$\begin{pmatrix} a & b \\ c & d \end{pmatrix}^{-1} = \frac{1}{ad - bc} \begin{pmatrix} d & -b \\ -c & a \end{pmatrix}$$

For polarizers, however, the determinant goes to zero. For lossy components (i.e. components with determinants less than 1) the transformations require gain to reverse the effect. This type of transformation can be difficult in practice. As an alternate approach, the adjoint of the transformation may be used to take the polarization state back to being proportional to the input state. The adjoint (i.e. adjugate) is not equivalent to the conjugate transpose. There are occasions when the inverse matrix may be optimal but the adjoint matrix is sufficient as shown in the following example:

$$\begin{pmatrix} d & -b \\ -c & a \end{pmatrix} \begin{pmatrix} a & b \\ c & d \end{pmatrix} \begin{pmatrix} E_H \\ E_V \end{pmatrix} = \begin{pmatrix} ad - bc & 0 \\ 0 & ad - bc \end{pmatrix} \begin{pmatrix} E_H \\ E_V \end{pmatrix} = (ad - bc) \begin{pmatrix} E_H \\ E_V \end{pmatrix}$$

A matrix factorization method called polar decomposition may be useful for matrix inversion. Polar decomposition can be used to classify or reduce transformation parameters for analytical purposes. The key concept in polar decomposition is that any square matrix can be decomposed into one unitary and one positive semi definite Hermitian factors as follows:

$$A = UP$$

A unitary matrix has the following property:

$$U \cdot U^* = U^* \cdot U = \begin{pmatrix} 1 & 0 \\ 0 & 1 \end{pmatrix}$$

where U* is the conjugate transpose of U, the unitary matrix components are of the following form:

$$\begin{pmatrix} u_1 & iu_2 \\ \overline{iu_2} & \overline{u_1} \end{pmatrix}$$

With $u_1$ and $u_2$ being complex, the matrix components have the additional requirement that $|u_1|^2 + |u_2|^2 = 1$. For every Jones vector x, a positive semi definite Hermitian matrix has the following properties:

$$x^* P x \geq 0 \text{ and } P^* = P$$

Given these definitions, the polar decomposition factors of A may be given as follows:

$$P = \sqrt{A^* A}$$

$$P \propto \begin{pmatrix} d + a^* & c^* - b \\ b^* - c & a + d^* \end{pmatrix} \begin{pmatrix} a & b \\ c & d \end{pmatrix}$$

$$U = AP^{-1}$$

$$U \propto \begin{pmatrix} a + d^* & b - c^* \\ c - b^* & d + a^* \end{pmatrix}$$

Polarizers are limiting cases of diattenuators or "dichroics." The loss in one polarization is different than the loss in the orthogonal polarization as show in the following matrix:

$$\begin{pmatrix} p & 0 \\ 0 & q \end{pmatrix} \quad 0 \le |p|, |q| \le 1$$

Specifically, the horizontal polarization field is reduced by a factor of p, while the vertical polarization field is reduced by a factor of q. For example, consider the horizontal polarizer case where p=1 and q=0. The diattenuator may be rotated into an arbitrary angle with the rotation matrix given previously, however the field must also be rotated out of this intermediate coordinate system into the original coordinate system. As such, a diattenuator rotated by an angle $\theta$ may be represented by the following transformation:

$$\begin{pmatrix} \cos(\theta) & -\sin(\theta) \\ \sin(\theta) & \cos(\theta) \end{pmatrix} \cdot \begin{pmatrix} p & 0 \\ 0 & q \end{pmatrix} \cdot \begin{pmatrix} \cos(\theta) & \sin(\theta) \\ -\sin(\theta) & \cos(\theta) \end{pmatrix}$$

$$\begin{pmatrix} p\cos^2(\theta) + q\sin^2(\theta) & (p-q)\sin(\theta)\cos(\theta) \\ (p-q)\sin(\theta)\cos(\theta) & p\sin^2(\theta) + q\cos^2(\theta) \end{pmatrix}$$

$$\frac{p+q}{2} \begin{pmatrix} 1 + \frac{p-q}{p+q}\cos(2\theta) & \frac{p-q}{p+q}\sin(2\theta) \\ \frac{p-q}{p+q}\sin(2\theta) & 1 - \frac{p-q}{p+q}\cos(2\theta) \end{pmatrix}$$

In general, diattenuators may be represented by the positive semi definite Hermitian factor in the polar decomposition of the general distortion matrix A. As such, the matrix given above for a rotated diattenuator is a diagonal matrix transformation away from P.

Waveplates and interferometers are special cases of retardation transformations. The horizontal polarization may see a phase increase $\phi$ while the vertical polarization may see a phase lag of the same amount as shown in the following matrix:

$$\begin{pmatrix} e^{i\phi} & 0 \\ 0 & e^{-i\phi} \end{pmatrix}$$

If a retarder is rotated by an angle $\theta$ relative to the input polarization, the transformation is carried out similarly to the previous discussion as follows:

$$\begin{pmatrix} \cos(\theta) & -\sin(\theta) \\ \sin(\theta) & \cos(\theta) \end{pmatrix} \cdot \begin{pmatrix} e^{i\phi} & 0 \\ 0 & e^{-i\phi} \end{pmatrix} \cdot \begin{pmatrix} \cos(\theta) & \sin(\theta) \\ -\sin(\theta) & \cos(\theta) \end{pmatrix}$$

$$\begin{pmatrix} e^{i\phi}\cos^2(\theta) + e^{-i\phi}\sin^2(\theta) & (e^{i\phi} - e^{-i\phi})\sin(\theta)\cos(\theta) \\ (e^{i\phi} - e^{-i\phi})\sin(\theta)\cos(\theta) & e^{-i\phi}\cos^2(\theta) + e^{i\phi}\sin^2(\theta) \end{pmatrix}$$

$$\cos(\phi) \begin{pmatrix} 1 + i\tan(\phi)\cos(2\theta) & i\tan(\phi)\sin(2\theta) \\ i\tan(\phi)\sin(2\theta) & 1 - i\tan(\phi)\cos(2\theta) \end{pmatrix}$$

Figure 4:
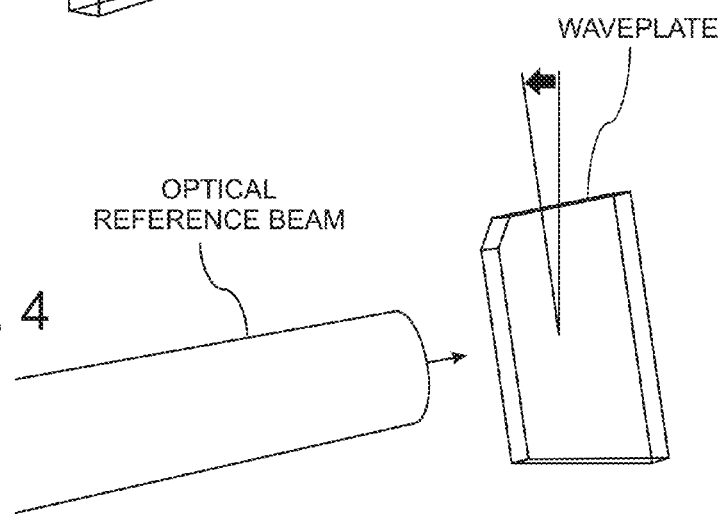
FIG. 4 is a simple diagram of a waveplate positioned in the optical reference beam in accordance with embodiments of the present disclosure.

A waveplate, as shown in FIG. 4, may be represented by the unitary factor in the polar decomposition of the general distortion matrix A. It can be shown that the matrix given above for a rotated waveplate is a diagonal matrix transformation away from U.

A distortion matrix A, representing periodic error, may be comprised of a series of component Jones matrices as follows:

$$A = \prod_{i=1}^{n} J_i = \begin{pmatrix} a & b \\ c & d \end{pmatrix}$$

The above matrix A is nonsingular, wherein $\text{Det}[A] \ne 0$ and therefore $\text{Det}[J_i] \ne 0$. For distortion correction, a Jones matrix that represents the optical correction, $\chi$ (i.e. $\chi = A^{-1}$) may be considered. The assumption that matrix A is nonsingular ensures matrix $A^{-1}$ exists mathematically. For example, consider the following possible component matrix $J_m$ of the distortion matrix A:

$$J_m = \begin{pmatrix} p & 0 \\ 0 & q \end{pmatrix} \text{ where } 0 < |p|, |q| \le 1$$

The inverse of this matrix $J_m$ may be represented as follows:

$$J_m^{-1} = \begin{pmatrix} 1/p & 0 \\ 0 & 1/q \end{pmatrix} \text{ where } 1 \le |1/p|, |1/q| < \infty$$

In general the inverse matrix $J_m^{-1}$ would require gain. If $\chi = A^{-1}$, then there is no gain. However, any matrix proportional to the inverse will also eliminate polarization leakage (i.e. periodic error). To confirm, assume the arbitrary, complex, constant of proportionality to be the value p*q, the following equation to be true:

$$pqJ_m^{-1} = \begin{pmatrix} pq/p & 0 \\ 0 & pq/q \end{pmatrix} = \begin{pmatrix} q & 0 \\ 0 & p \end{pmatrix}$$

In the above example a dichroic element can be corrected by an identical dichroic element that has been rotated 90 degrees. The resulting product of p*q $J_m$ $J_m^{-1}$ is a scalar multiple p*q times the Identity matrix.

The requirements on the correction matrix $\chi$ may be relaxed further. For example, the following equations may be used:

$$\chi \cdot A = D \text{ with } D = \begin{pmatrix} d_1 & 0 \\ 0 & d_2 \end{pmatrix}$$

The diagonal matrix elements $d_1$, $d_2$ are arbitrary complex values that are not equal to zero. To determine if matrix $\chi$ will affect the interferometric measurement, an example interferometer is modeled as follows:

$$v_m = \begin{pmatrix} 1 & 1 \\ 1 & 1 \end{pmatrix} \cdot \begin{pmatrix} e^{ikM} & 0 \\ 0 & e^{ikR} \end{pmatrix} \cdot \chi \cdot A \cdot \begin{pmatrix} e^{i\omega_1 t} \\ e^{i\omega_2 t} \end{pmatrix}$$

$$v_m \cdot \overline{v_m} \propto |d_1 e^{i(kM + \omega_1 t)} + d_2 e^{i(kR + \omega_2 t)}|^2 =$$

$$|d_1|^2 + |d_2|^2 + 2|d_1 d_2|\cos(k(M-R) + (\omega_1 - \omega_2)t + \arg(d_1 - d_2))$$

The signal contrast is potentially reduced if D is not equal to the identity matrix. The phase offset $\arg(d_1 - d_2)$ is not an issue if it does not vary along the path that separates the split frequency reference measurement from the interferometric displacement measurement. This is the principle that drives the fiber fed products to establish a split frequency reference after fiber delivery, not before.

As shown above, this correction matrix definition (without gain) is sufficient to describe the passive optical distortion cancellation. Therefore, distortions caused by a series of waveplates and dichroics may be corrected by identical waveplates and dichroics that are rotated by 90 degrees. Other properties of the correction matrix $\chi$ are shown as follows:

$$\chi_L \cdot A = D \qquad\qquad A \cdot \chi_R = D$$

$$\alpha \begin{pmatrix} 1 & -b/d \\ -c/a & 1 \end{pmatrix} \cdot \begin{pmatrix} a & b \\ c & d \end{pmatrix} = D \qquad \begin{pmatrix} a & b \\ c & d \end{pmatrix} \cdot \begin{pmatrix} 1 & -b/a \\ -c/d & 1 \end{pmatrix} \alpha = D$$

$$\chi_L = \alpha \begin{pmatrix} 1 & -b/d \\ -c/a & 1 \end{pmatrix} \qquad \chi_R = \alpha \begin{pmatrix} 1 & -b/a \\ -c/d & 1 \end{pmatrix}$$

$$\chi_L \neq \chi_R$$

An important conclusion is while the distortion matrix has four independent complex variables, the correction matrix only depends on two off diagonal elements.

When attempting to correct distortions both upstream and downstream simultaneously, consider the following:

$$A_2 \cdot \chi \cdot A_1 \begin{pmatrix} a2 & b2 \\ c2 & d2 \end{pmatrix} \cdot \begin{pmatrix} 1 & -b2/a2 \\ -c2/d2 & 1 \end{pmatrix} \cdot$$

$$D \cdot \begin{pmatrix} 1 & -b1/d1 \\ -c1/a1 & 1 \end{pmatrix} \cdot \begin{pmatrix} a1 & b1 \\ c1 & d1 \end{pmatrix}$$

In general, this correction matrix is not a two parameter problem. However, if limited to small corrections (b1,b2, c1,c2<<1) and (D−I<<I) where I is the identity matrix then the first order approximation holds as follows:

$$\sim \begin{pmatrix} a2 & b2 \\ c2 & d2 \end{pmatrix} \cdot \begin{pmatrix} 1 & -b2/a2 - b1/d1 \\ -c2/d2 - c1/a1 & 1 \end{pmatrix} \cdot \begin{pmatrix} a1 & b1 \\ c1 & d1 \end{pmatrix}$$

The following is the correction matrix that can be applied to a slightly modified single downstream distortion:

$$A_{\it eff} \cdot \chi \begin{pmatrix} 1 & b2/a2 + b1/d1 \\ c2/d2 + c1/a1 & 1 \end{pmatrix} \cdot$$

$$\begin{pmatrix} 1 & -b2/a2 - b1/d1 \\ -c2/d2 - c1/a1 & 1 \end{pmatrix}$$

Therefore, optical correction is possible for an arbitrary distortion matrix A with the assumptions covered previously. One correction method uses a pair of retarders and dichroics (i.e. polarization elements 120a and 120b), positioned between a pair of quarter wave plates (i.e. QWPs 115a and 115b). This approach allows the mathematical analysis to be simplified using a first order approximation for rotated retarders and dichroics:

$$\frac{p+q}{2} \begin{pmatrix} 1 + \frac{p-q}{p+q}\cos(2\theta) & \frac{p-q}{p+q}\sin(2\theta) \\ \frac{p-q}{p+q}\sin(2\theta) & 1 - \frac{p-q}{p+q}\cos(2\theta) \end{pmatrix} \Bigg|_{\frac{p-q}{p+q} = \Delta, \theta \to \theta + \pi/4} \propto$$

$$\begin{pmatrix} 1 - \Delta\sin(2\theta) & \Delta\cos(2\theta) \\ \Delta\cos(2\theta) & 1 + \Delta\sin(2\theta) \end{pmatrix} \Bigg|_{\theta \to 0} \sim \begin{pmatrix} 1 & \Delta \\ \Delta & 1 \end{pmatrix}$$

$$\cos(\phi) \begin{pmatrix} 1 + i\tan(\phi)\cos(2\theta) & i\tan(\phi)\sin(2\theta) \\ i\tan(\phi)\sin(2\theta) & 1 - i\tan(\phi)\cos(2\theta) \end{pmatrix} \Bigg|_{\theta \to \theta + \pi/4} \propto$$

$$\begin{pmatrix} 1 - i\tan(\phi)\sin(2\theta) & i\tan(\phi)\cos(2\theta) \\ i\tan(\phi)\cos(2\theta) & 1 + i\tan(\phi)\sin(2\theta) \end{pmatrix} \Bigg|_{\theta, \phi \to 0} \sim \begin{pmatrix} 1 & i\phi \\ i\phi & 1 \end{pmatrix}$$

Combining these components to first order results in complex off diagonal elements yields the following:

$$\begin{pmatrix} 1 & \Delta \\ \Delta & 1 \end{pmatrix} \cdot \begin{pmatrix} 1 & i\phi \\ i\phi & 1 \end{pmatrix} = \begin{pmatrix} 1 + i\Delta\phi & \Delta + i\phi \\ \Delta + i\phi & 1 + i\Delta\phi \end{pmatrix} \Bigg|_{\Delta, \phi \to 0} \sim \begin{pmatrix} 1 & \Delta + i\phi \\ \Delta + i\phi & 1 \end{pmatrix}$$

This is the effect of the first set of retarder and dichroic (i.e. polarization element 120a). The rotation θ is used to fine tune the actual value of the off diagonal elements. The retardation ϕ and diattenuation Δ may also be fine tuned during alignment.

Applying orthogonal quarter wave plates, (i.e., QWPs 115a and 115b, as shown in FIG. 1) the off diagonal elements are effected as follows:

$$\begin{pmatrix} e^{i\pi/4} & 0 \\ 0 & e^{-i\pi/4} \end{pmatrix} \cdot \begin{pmatrix} 1 & \Delta + i\phi \\ \Delta + i\phi & 1 \end{pmatrix} \cdot \begin{pmatrix} e^{-i\pi/4} & 0 \\ 0 & e^{i\pi/4} \end{pmatrix} =$$

$$\begin{pmatrix} 1 & i(\Delta + i\phi) \\ -i(\Delta + i\phi) & 1 \end{pmatrix}$$

Specifically, having one retarder and one dichroic (i.e. polarization element 120a) between orthogonal waveplates (i.e., QWPs 115a and 115b) creates a difference between the off diagonal elements. The correction matrix $\chi$, which includes two independent off diagonal elements, may be assembled with a pair of retarders and dichroics (i.e., polarization elements 120a and 120b), wherein one is set between fixed quarter wave plates (i.e., QWPs 115a and 115b).

As discussed previously in the disclosure, the dichroic and retarder (i.e. polarization element 120) may be implemented in a waveplate that is tunable in two degrees of freedom (i.e. two adjustments). Specifically, if the waveplate is uncoated on one surface, or has some reflection coating with significant reflection difference between the "S" and "P" polarization states, then the two adjustments may be used to fine tune both the retardation and diattenuation. There is a rotation about the beam propagation axis and there is a rotation such that the surface normal is adjusted out of alignment with the beam propagation axis. These two adjustments allow the tuning of the correction polarization transformation to the measured distortion. In a two frequency optical reference beam, this polarization distortion may be modeled in terms of the polarization null angles and depth. In this example, the QWPs 115a and 115b, and polarization elements 120a and 120 would still be required as described in FIG. 1.

Figure 5:
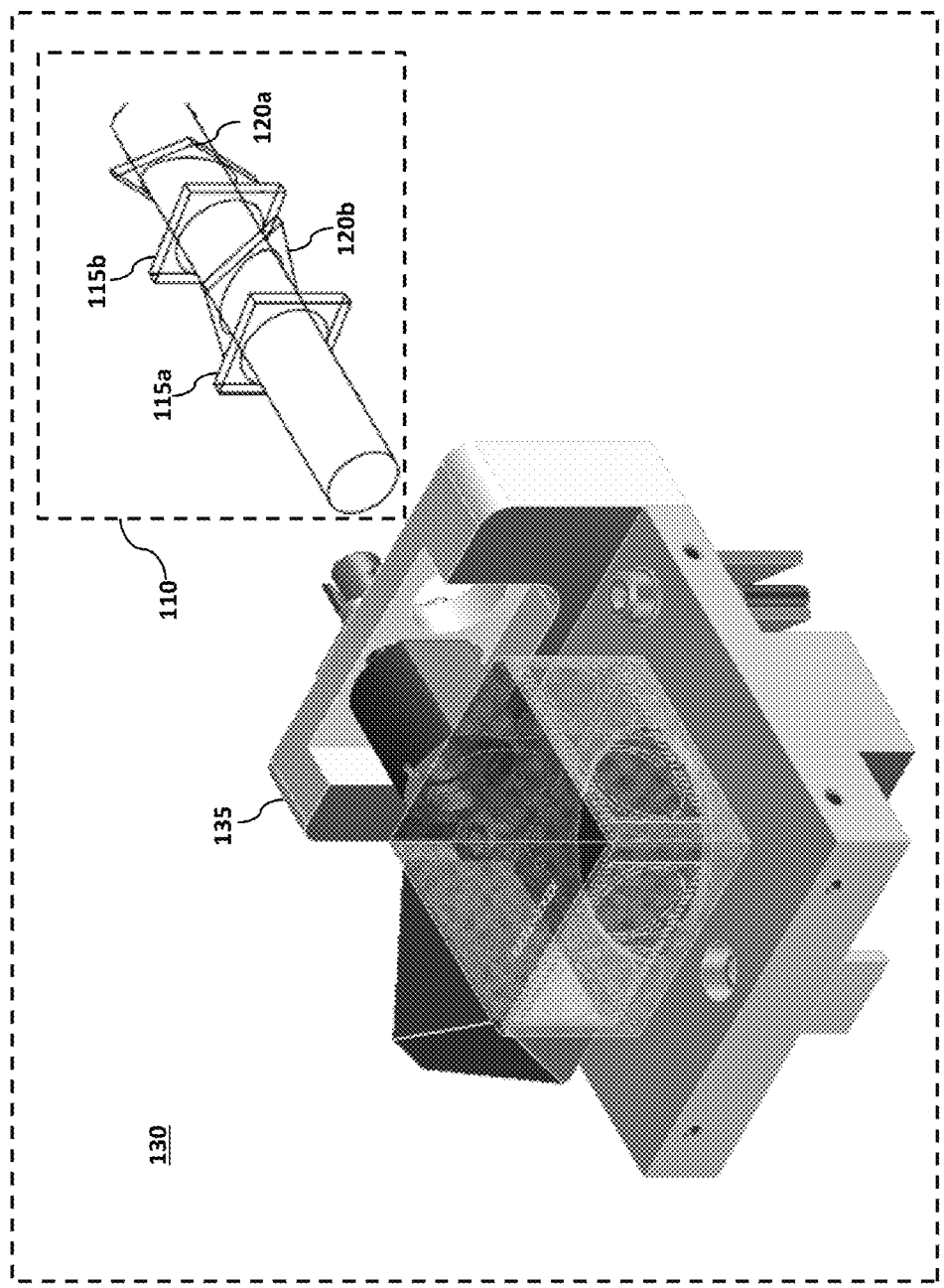
FIG. 5 is a diagram of an interferometer including the optical system of FIG. 1 in accordance with embodiments of the present disclosure.

Finally, any optical device or system that requires pure polarization states may be dramatically improved using the optical system 110. FIG. 5 is a diagram illustrating a low periodic error (LPE) optical interferometer 130 in accordance with embodiments of the present disclosure. The LPE optical interferometer 130 includes a basic interferometer 135 and the optical system 110 of FIG. 1. The optical system 110 is positioned on an input of the basic optical interferometer 135 and reduces periodic error of an optical reference beam applied to the input. In other embodiments, the optical system 110 may be positioned on an output of the basic optical interferometer 135.

In other embodiments, the optical system 110 may be integrated with a polarization-maintaining (PM) optical fiber. The PM optical fiber may be used to preserve a polarization state of a reference laser. The optical system 110 improves the polarization isolation between two orthogonal modes in the PM optical fiber. The PM optical fiber may be implemented with an optical interferometer or other sensor system.

In other embodiments, the optical system 110 may be integrated within a laser scanning device. The laser scanning device may be a light detection and ranging (LiDAR) device. In other embodiments, the optical system 110 may be integrated within at least one a communication based fiber optic transmitter device, a communication based fiber optic receiver device, or a fiber optic amplifier. In other embodiments, the optical system 110 may be integrated within in free space optics communication system. In other embodiments, the optical system 110 may be integrated within a passive optical fiber assembly. In other embodiments, the optical system 110 may be integrated within a fiber optic sensor system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Therefore, the embodiments disclosed should not be limited to any single embodiment, but rather should be construed in breadth and scope in accordance with the appended claims.

What is claimed is:

1. An optical system for improving polarization of an optical reference beam, the optical system comprising:
   a first quarter wavelength plate (QWP) positioned in a beam path of the optical system;
   a first polarization element positioned in the beam path, the first polarization element being configured to provide diattenuation and retardance of the optical reference beam;
   a second QWP positioned in the beam path such that a fast axis of the second QWP is substantially orthogonal to a fast axis of the first QWP; and
   a second polarization element positioned in the beam path, the second polarization element being configured to provide diattenuation and retardance of the optical reference beam.

2. The optical system of claim 1, wherein the system is configured to substantially reduce a periodic error of the optical reference beam.

3. The optical system of claim 2, wherein the first QWP is configured such that a slow axis of the first QWP is parallel to a polarization vector of a first optical wave of the optical reference beam.

4. The optical system of claim 3, wherein the second QWP is configured such that a slow axis of the second QWP is perpendicular to the slow axis of the first QWP.

5. The optical system of claim 4, wherein the first polarization element comprises a first waveplate having a surface with an anti-reflective (AR) coating and a surface without an AR coating.

6. The optical system of claim 5, wherein the second polarization element comprises a second waveplate having a surface with an AR coating and a surface without an AR coating.

7. The optical system of claim 6, wherein the first polarization element is configured to provide a tunable rotational angle about a surface normal of the first polarization element and a tunable incident angle relative to the beam path.

8. The optical system of claim 7, wherein the second polarization element is configured to provide a tunable rotational angle about the surface normal of the second polarization element and a tunable incident angle relative to the beam path.

9. The optical system of claim 8, wherein the first QWP is positioned such that a surface normal of the first QWP is substantially parallel to the beam path.

10. The optical system of claim 9, wherein the second QWP is positioned such that a surface normal of the second QWP is substantially parallel to the beam path.

11. The optical system of claim 10, wherein the optical system is a passive optical system.

12. The optical system of claim 11, wherein the optical system is configured to provide an exiting beam that is substantially parallel to an incident beam.

13. The optical system of claim 12, wherein the first QWP is positioned first in the beam path and the first polarization element is positioned between the first QWP and the second QWP.

14. The optical system of claim 11, wherein the first polarization element is positioned first in the beam path and the first QWP is positioned between the first polarization element and the second polarization element.

15. The optical system of claim 1, wherein the optical system is integrated within an optical heterodyne interferometer.

16. The optical system of claim 1, wherein the optical system is integrated within the optical reference source.

17. The optical system of claim 1, wherein the optical system is integrated within a laser scanning device.

18. The optical system of claim 1, wherein the optical system is integrated within at least one of a communication based fiber optic transmitter device, a communication based fiber optic receiver device, or a fiber optic amplifier.

19. The optical system of claim 1, wherein the optical system is integrated within a passive optical fiber assembly.

20. The optical system of claim 1, wherein the optical system is integrated within a fiber optic sensor system.

* * * * *